US009535533B2

(12) United States Patent
Gomes et al.

(10) Patent No.: US 9,535,533 B2
(45) Date of Patent: Jan. 3, 2017

(54) TOUCH SYSTEMS AND METHODS UTILIZING CUSTOMIZED SENSORS AND GENERICIZED CONTROLLERS

(75) Inventors: Rodrigo S. Gomes, Medford, MA (US); Richard A. Peterson, Jr., Chelmsford, MA (US); Bruce A. Lessard, Salem, MA (US); Gordon F. Taylor, Bolton, MA (US)

(73) Assignee: 3M Innovative Properties Company, St. Paul, MN (US)

( * ) Notice: Subject to any disclaimer, the term of this patent is extended or adjusted under 35 U.S.C. 154(b) by 2124 days.

(21) Appl. No.: 12/577,849

(22) Filed: Oct. 13, 2009

(65) Prior Publication Data
US 2010/0097336 A1 Apr. 22, 2010

Related U.S. Application Data

(60) Provisional application No. 61/106,898, filed on Oct. 20, 2008.

(51) Int. Cl.
*G06F 3/041* (2006.01)
(52) U.S. Cl.
CPC .................. *G06F 3/0418* (2013.01)
(58) Field of Classification Search
USPC ................................................ 345/173–178
See application file for complete search history.

(56) References Cited

U.S. PATENT DOCUMENTS

| 5,101,081 | A | 3/1992 | Drumm |
| 5,940,065 | A | 8/1999 | Babb et al. |
| 6,977,646 | B1 | 12/2005 | Hauck et al. |
| 7,236,161 | B2 | 6/2007 | Geaghan et al. |
| 7,237,086 | B1 | 6/2007 | Kothandapani et al. |
| 7,254,775 | B2 | 8/2007 | Geaghan et al. |
| 7,362,313 | B2 | 4/2008 | Geaghan et al. |
| 2003/0067447 | A1 | 4/2003 | Geaghan et al. |
| 2004/0183787 | A1 | 9/2004 | Geaghan et al. |
| 2006/0022959 | A1 | 2/2006 | Geaghan |
| 2006/0227114 | A1 | 10/2006 | Geaghan et al. |
| 2006/0244733 | A1 | 11/2006 | Geaghan |
| 2006/0267953 | A1 | 11/2006 | Peterson, Jr. et al. |
| 2006/0279548 | A1 | 12/2006 | Geaghan |
| 2007/0034423 | A1 | 2/2007 | Rebeschi et al. |

(Continued)

FOREIGN PATENT DOCUMENTS

| WO | WO 2007/137415 | 12/2007 |
| WO | WO 2008/118651 | 10/2008 |

OTHER PUBLICATIONS

International Search Report, PCT/US2009/060445, 3 pages.

*Primary Examiner* — Dennis Joseph
(74) *Attorney, Agent, or Firm* — Robert S. Moshrefzadeh

(57) ABSTRACT

Touch sensing circuit arrangements include a touch sensor and a controller board. The touch sensor includes one or more sensing elements to generate touch-related signals responsive to a touch input to the sensor, and a memory device storing computer-executable firmware instructions for determining touch positions based on the touch-related signals. The controller board includes query logic executable by the controller board to cause the controller board to query for the computer-executable firmware instructions stored on the memory device of the touch sensor, and a processor circuit to determine touch positions by executing the firmware instructions loaded onto the generic controller board in response to the query.

10 Claims, 7 Drawing Sheets

(56) References Cited

U.S. PATENT DOCUMENTS

2007/0074913 A1 4/2007 Geaghan et al.
2008/0136793 A1 6/2008 Yamamoto et al.
2008/0142281 A1 6/2008 Geaghan
2008/0211782 A1 9/2008 Geaghan et al.

TOUCH SYSTEMS AND METHODS UTILIZING CUSTOMIZED SENSORS AND GENERICIZED CONTROLLERS

CROSS REFERENCE TO RELATED APPLICATION

This application claims the benefit of U.S. Provisional Patent Application No. 61/106,898, filed Oct. 20, 2008, the disclosure of which is incorporated by reference herein in its entirety.

The present invention relates generally to touch input systems and methods for using, manufacturing, testing, and tracking touch systems and components for touch systems, and in particular to touch systems including generic controller boards usable across multiple different customized sensors.

BACKGROUND

Touch sensing devices allow a user to conveniently and directly interface with electronic systems and displays in an intuitive manner. For example, a user can carry out a complicated sequence of instructions by simply touching an on-display touch screen at a location identified by an icon. While the user physically interacts with the sensor portion of the touch system, controller electronics operate behind the scene to perform calculations based on received touch signals so that information such as touch position may be determined. The sensor portion and the controller electronics portion are designed to function together such that the signals generated by the sensor portion in response to a touch input may be used by the controller electronics to determine valid touch positions. Because the sensor and controller are designed to function together, replacing the sensor portion (for repair, upgrading, or other reasons) may require replacing the controller or manually uploading new firmware onto the controller.

SUMMARY OF THE INVENTION

In certain embodiments, the present invention provides methods of manufacturing touch sensing circuit arrangements, each touch sensing circuit arrangement including a sensor to generate touch-related signals responsive to a touch input to the sensor, and a controller board to determine touch positions based on the touch-related signals. Such methods involve producing a plurality of different sensors, each of the different sensors customized by including a memory device storing computer-executable firmware instructions executable by the controller board for determining touch positions, producing a plurality of controller boards, and assembling a touch sensing circuit arrangement that includes one of the plurality of different sensors and that includes one of the plurality of controller boards.

In certain other embodiments, the present invention provides touch sensing circuit arrangements that include a touch sensor coupled to a controller board, and further including computer-executable firmware instructions for determining touch positions. In such touch sensing circuit arrangements, the touch sensor includes one or more sensing elements to generate touch-related signals responsive to a touch input to the sensor, and a memory device storing the computer-executable firmware instructions. Moreover, the controller board includes query logic executable by the controller board to cause the controller board to query for the computer-executable firmware instructions stored on the memory device of the touch sensor, and a processor circuit to determine touch positions by executing the firmware instructions loaded onto the generic controller board in response to the query.

In certain other embodiments, the present invention provides systems which include touch sensing circuit arrangements including computer-executable firmware instructions for determining touch positions, and which have a controller board including a processor circuit to determine touch positions using the computer-executable firmware instructions, the system including one or more sensing elements to generate touch-related signals responsive to a touch input to a surface of the sensor, the touch-related signals carried by a plurality of signal lines, a memory device storing the computer-executable firmware instructions, and a connector to communicatively couple the controller board to the signal lines and to the memory device for communication of the touch-related signals and the computer-executable firmware instructions.

In certain other embodiments, the present invention provides methods for tracking parts for assembling touch sensing circuit arrangements responsive to specific orders, such methods including associating a different sensor-part number with each of a plurality of different types of sensors, each of the different sensors including a memory device storing computer-executable firmware instructions specific to the type of sensor for determining touch positions; associating a single controller-part number with each of a plurality of controller boards, each controller board configured for connection to each different type of sensor; for each different sensor-part number, managing an inventory of the associated type of sensor based in part on sensor-specific information contained in the orders; and managing an inventory of the controller boards based in part on the total inventory for all of the different sensors.

In certain other embodiments, the present invention provides testing methods for use with a touch sensing circuit arrangement that includes a controller board to determine touch positions based on touch-related signals generated by a sensor responsive to a touch input to the sensor, the sensor including a memory device storing a configuration profile including computer-executable firmware instructions for determining touch positions. Such testing methods include assembling the touch sensing circuit arrangement by connecting the sensor to the controller board, loading the computer-executable firmware instructions onto the controller board from the sensor memory device, stimulating the touch sensor to generate test touch signals, evaluating the test touch signals using the computer-executable firmware instructions loaded onto the controller board, and verifying or modifying the configuration profile for the sensor responsive to results of the test touch signal evaluating step.

In certain other embodiments, the present invention provides touch sensors that include one or more sensing elements to generate touch-related signals responsive to a touch input to the one or more sensing elements, circuitry for communicating the touch-related signals to a communicatively coupled device, and a memory device storing computer-executable firmware instructions that, when executed by the communicatively coupled device, cause the communicatively coupled device to resolve the touch-related signals into touch input position information.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

The present disclosure may be more completely understood and appreciated in consideration of the following detailed description of various embodiments in connection with the accompanying drawings, in which.

Figure 1A:
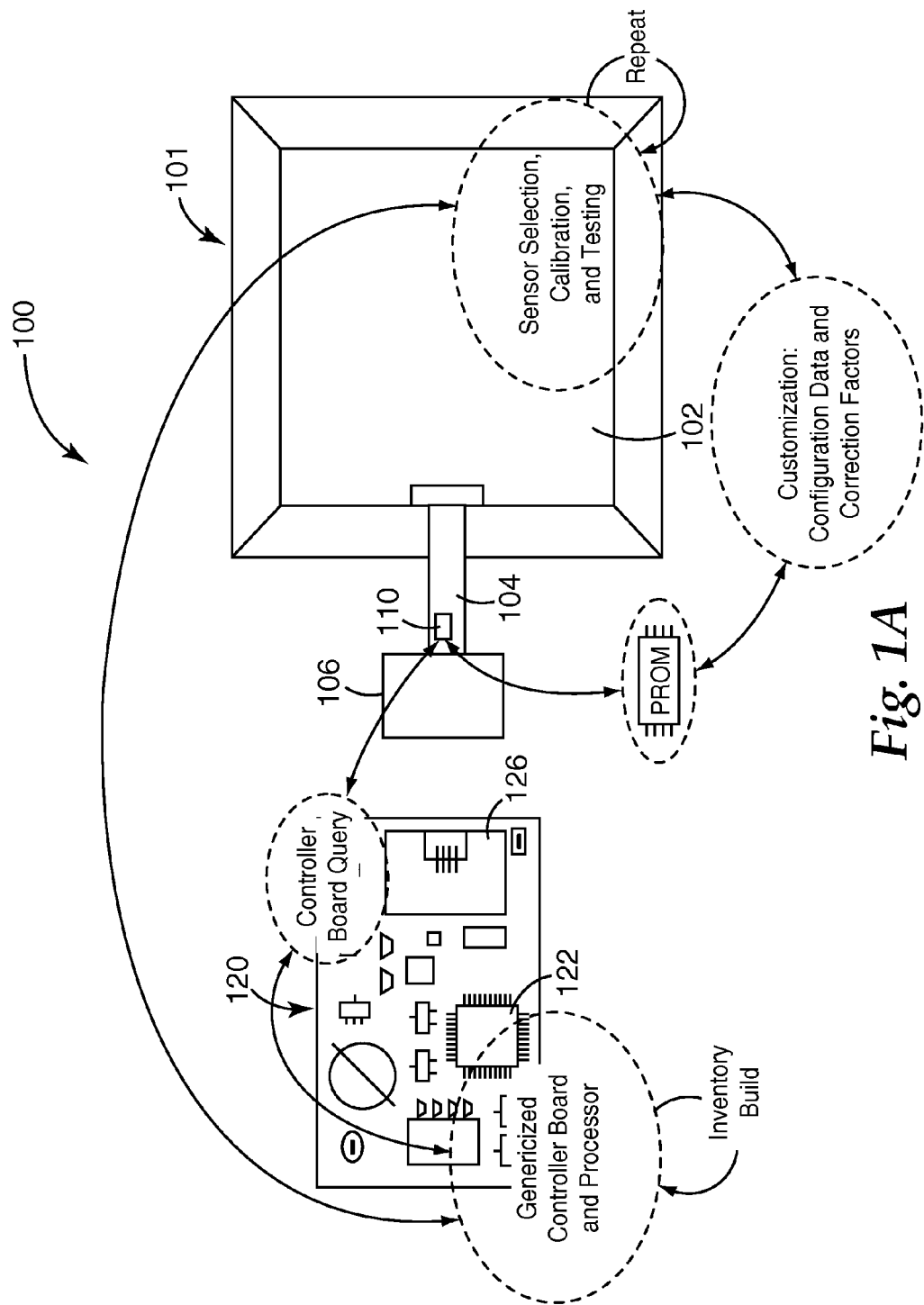
FIG. 1A schematically illustrates a touch sensing circuit arrangement, along with data and process flow items, in accordance with certain embodiments of the present invention.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

The present invention is generally applicable to touch sensing systems, to sensor and controller components of touch sensing circuit arrangements, and to methods of manufacturing, testing, and tracking touch sensing system components. In certain embodiments, aspects of the present invention are implemented through customization of sensor components, allowing a generic controller boards to be used across multiple types of sensors, sensor applications, and customer-specific functionalities. Sensor customization includes the storing of a computer-executable configuration profile on a memory device that is mounted to the sensor. The computer-executable configuration profile includes computer-executable instructions for determining touch positions, and optionally includes other instructions or sensor-related data such as calibration factors developed for each specific sensor.

For the sake of convenience and without loss of generality, various aspects of the present invention are described below in terms of controller-executable firmware being stored on a memory device of a sensor for retrieval by a controller board to determine touch positions, although it will be understood that addition data or sensor configuration information may also be stored on the sensor for retrieval by the controller board.

In certain embodiments, the present invention provides for touch sensing circuit arrangements and components thereof, methods of producing and testing touch sensing circuit arrangements and components thereof, and methods of managing inventory of touch sensing circuit components. Such touch sensing circuit components include a touch sensor and a controller board. The touch sensor includes one or more sensing elements to generate touch-related signals responsive to a touch input to the sensor, and a memory device storing computer-executable firmware instructions for determining touch positions based on the touch-related signals. The controller board includes query logic executable by the controller board to cause the controller board to query for the computer-executable firmware instructions stored on the memory device of the touch sensor, and a processor circuit to determine touch positions by executing the firmware instructions loaded onto the generic controller board in response to the query.

In accordance with certain embodiments, a generic controller platform is utilized for a variety of different customized sensors. The generic controller platform uses a single controller board having circuitry that is common for each of the different customized sensors. Sensors may be customized according to different touch sensing techniques (for example, capacitive, resistive, force, etc.) and/or according to different controller-executable firmware or sensor configuration data stored along with the sensor. The controller-executable firmware includes instructions for determining touch positions, and may also include other application-specific or customer-specific functionalities such as instructions for determining touch pressure, instructions for distinguishing multiple touches or users, instructions for distinguishing noise from touch-related signals, and so forth. The computer-executable configuration profile may further include touch position correction factors that are developed for the particular touch sensor based on a calibration routine.

In accordance with certain embodiments, storing the computer-executable configuration profile for each different customized sensor or sensor type along with that sensor allows genericized controller electronics to be produced, in certain embodiments, without pre-loaded firmware for determining touch positions. In certain embodiments, the controller board includes no permanently stored firmware or instructions other than those used to query for and retrieve the controller-executable firmware. This can further allow production of generic controller boards either without memory devices for permanent storage of firmware, or with smaller memory devices, thereby saving on controller board costs. Moreover, the generic controller boards may include a hardwired initialization routine that queries for controller-executable firmware, which can be automatically retrieved from the memory device of a sensor that is connected to the controller board for use by a processor circuit on the controller board to determine touch position information. This can reduce the burden on field technicians and touch system integrators who might otherwise be required to manually select and load firmware onto the controller board, thereby simplifying installation, testing and repair operations in the field.

Aspects of the present invention also lend themselves to field service aimed at replacing damaged sensors and/or upgrading to sensors or firmware with new functionalities. When a touch sensor of the present invention requires field replacement, field service personnel can replace both the touch sensor and the firmware by simply replacing the touch sensor assembly. Storing the controller-executable instructions to a memory device mounted on the sensor may also facilitate easier introduction of new sensing technologies or functionalities that are compatible with the existing generic controller hardware.

In certain embodiments, aspects of the present invention can also provide for simplified management of touch sensor system component inventories. Conventional inventory management of touch sensing system components has involved tracking both of the different touch sensors and of different controllers to ensure that mated sets of sensors and controllers are provided to customers. Aspects of the present invention allow for the use of a single generic controller board type across multiple different and customized sensors so that mated sets are produced without requiring the tracking of different controller types. As such, separate sensor-part numbers may be assigned to each different type of customized sensor, with a single controller-part number being assigned to all of the generic controller boards. Tracking of parts thus involves the tracking of customized sensors parts, and managing the overall inventory of generic controller boards. Customer orders may be filled by matching sensor part numbers to order-specific information and by providing the required number of controller boards.

In certain embodiments, the touch sensor includes an electrical tail, such as a flexible cable or flex circuit, which is attached to the sensor substrate. The tail routes signal lines between the touch sensor and the controller board, which is interfaced with the sensor, in one embodiment, via a mated connector pair, one connector being at the end of the tail and the other connector being on the controller board. Other connector configurations could be used. The tail can also be used to provide an electrical connection between the controller board and the non-volatile memory device attached to the sensor that stores the controller-executable firmware and optionally other configuration data. The non-volatile memory device may be a Programmable Read Only Memory (PROM) device, for example an Electrically Erasable PROM (EEPROM), or any other suitable device for permanent or long-term storage of the controller-executable firmware for determining touch positions. While the tail may provide a convenient location to mount the non-volatile memory device, the memory device may be attached to the sensor at other locations such as on the periphery of the sensor surface.

The non-volatile memory device stores controller-executable firmware that includes instructions that are executable by a processor circuit on the controller board to determine touch input locations from touch-related signals, which are received by the controller board from the touch sensor response to a touch input. The controller-executable firmware may also include instructions executable to perform additional functions and/or to apply correction factors to the determined touch location based on pre-determined correction coefficients and/or based on features detected in the received touch-related signals. Such additional functions may include, for example:

system diagnostic functions and touch simulation, such as disclosed in U.S. Pat. Nos. 7,362,313 and 7,236,161, and in U.S. Pub. No. 20080211782, each of which is incorporated herein by reference;

distinguishing among multiple touches and/or users, such as disclosed in U.S. Pat. No. 7,254,775, and in U.S. Pub. Nos. 20060022959 and 20030067447, each of which is incorporated herein by reference;

detecting or compensating for various sources of noise that may be present in the touch-related signals, such as disclosed in U.S. Pub. Nos. 20070034423 20060267953, which are incorporated herein by reference;

compensating for charge accumulation on the sensor, such as disclosed in U.S. Pub. No. 20080142281, which is incorporated herein by reference;

independent adjustment of each of a plurality of sensing channels, such as disclosed in U.S. Pub. No. 20070074913, which is incorporated herein by reference;

using multiple different touch position determination algorithms for touch coordinate refinement and/or confirmation, such as disclosed in U.S. Pub. No. 20060279548, which is incorporated herein by reference;

detecting and tracking pre-touch signals, such as disclosed in U.S. Pub. No. 20060244733, which is incorporated herein by reference; and correcting errors caused by sensor movement, such as disclosed in U.S. Pub. No. 20060227114, which is incorporated herein by reference.

Other functionalities that may be built into the controller-executable firmware include palm rejection routines and parameters, controller wake-on routines, sensor operating frequency parameters (for example, based on known or expected installation locations), rear shield simulation routines for use with sensors that lack a rear shielding layer, routines for reducing effects on touch position determinations of higher electrostatic discharge (ESD) immunity requirements, and so forth.

In certain embodiments, sensor-specific corrections factors may be stored on the sensor memory device as part of a sensor configuration profile. Such correction factors may be generating during a touch sensor linearization and/or calibration routine, which may be performed (and tested) during manufacturing, at the time of shipping, during installation, or at any suitable time. Examples of sensor surface linearization routines for analog capacitive touch sensors include those disclosed in U.S. Pat. No. 6,977,646, which is incorporated herein by reference. As discussed, the correction factors may be stored with the associated customized touch sensor along with the controller-executable firmware.

During the latter stages of the manufacturing process for a touch sensor component, the memory device for storing the controller-executable firmware is attached to the sensor in a manner that allows connection of the memory device to controller electronics for query and retrieval of the controller-executable firmware, along with any sensor-related configuration profile. In certain embodiments, the non-volatile memory device is mounted on the electronic tail of the touch sensor, with electrical leads running from the memory device to a connector at the end of the tail. This allows for a single connection that can provide the controller electronics with access to the touch-related signals produced by the touch sensor and the configuration information stored on the sensor memory. Storing of the information on the non-volatile memory device may be performed either before or after mounting the device to the sensor. Once attached and loaded with the controller-executable firmware, including any correction coefficients, the sensor is fully customized and ready for assembly with a generic controller board, with no separate controller board tracking required.

FIG. 1A schematically shows components of a touch sensing circuit arrangement 100, and indicating certain aspects of the production, testing, assembly, and use of the components in accordance with certain embodiments. The touch sensing circuit arrangement 100 includes a touch sensor 101 which provides a touch sensitive surface 102 for interacting with touch implements. In certain embodiments, the touch surface is transparent for positioning over a display device and viewing the display therethrough. The touch surface 102 includes one or more touch sensitive elements for generating touch-related signals in response to interactions of a touch implement with the touch surface. The touch-related signals are routed to an electrical tail 104 that ends in a connector 106 for interfacing with a controller board 120. Alternatively, each of multiple signal lines for carrying touch-related signals may be individually routed to a connector, or individually connected to the controller board.

As indicated, each sensor 101 is customized based on sensor type, firmware profile, sensor configuration profile, calibration data, and so forth. Moreover, the results of sensor selection, calibration, and testing may be used to develop or modify the customized configuration profile. Such calibration and testing may be repeated, for example during various stages of manufacturing, storage, packaging for shipment, installation, use, and repair.

In accordance with certain embodiments, controller-executable firmware for use by a controller to determine touch positions from touch-related signals generated by a sensor is stored on a memory device, such as the non-volatile PROM memory device indicated in FIG. 1. Attachment of the memory device 110 to the tail 104 allows the controller-executable firmware included in the stored configuration profile to be accessed by circuitry on the controller board 120. It will be appreciated that other mounting locations and attachment mechanisms can be used that allow interfacing between the memory device 110 and the controller board 120. The controller board 120 uses the controller-executable firmware instructions to determine touch position from the touch-related signals generated by the touch sensor 101. As discussed, in addition to instructions for determining and/or correcting touch positions, the controller-executable firmware may also include instructions for additional functionality, including functionality that may be applied to multiple sensing techniques (for example, noise reduction routines), functionality that is specific to one or more particular sensing technologies (for example, techniques for detecting multiple touches), and functionality that is specific to certain customers or applications (for example, ESD immunity). The configuration profile may include parameters specific to or optimized for the particular type of sensor and/or the expected or intended environment in which the sensor will be used. The memory device 110 may also store the sensor-specific correction coefficients derived from calibration and/or testing.

In addition to customizing the sensors via the stored firmware instructions and configuration profile, sensors may be customized by including additional hardware on the tail, or on another portion of the sensor, to adapt or otherwise pre-condition the touch-related signals prior to being sent to the controller board. Such additional hardware may be used to accommodate differences between various sensor technologies, allowing the use of similar touch position determination routines across multiple sensor types, even though sensor-specific firmware customization is employed. For example, amplifier circuits may be used to pre-amplify the touch force-related signals of force-sensing touch sensor prior to routing to the controller board for use with the customized firmware instructions stored with the sensor.

Referring again to FIG. 1A, the controller board 120 includes a connection port 126 for interfacing with the signal lines and memory device of the touch sensor 101. The controller board includes the hardware circuitry for processing the touch-related signals to calculate touch position measurements by executing the firmware instructions stored on the memory device 110 attached to the sensor 101. For example, the controller board 120 includes a processor 122 for processing touch-related signals by executing the firmware instructions. The controller board may be pre-loaded with default firmware instructions that are overwritten by the new firmware instructions contained on the sensor memory device 110. Alternatively, the controller board includes no pre-loaded firmware for determining touch location, and as a cost-savings measure may include no memory device for permanent storage of firmware instructions in anticipation of loading the firmware instructions from the sensor memory device 110 during a start-up routine.

The circuit board 120 may be hardwired to perform an initialization routine, which includes a query to find the firmware instructions and configuration data as stored on the sensor memory device 110. The firmware instructions and configuration data may be retrieved and locally stored for use by the processor 122 of the controller board 120. In this way, generic controller boards can be produced, each of which is usable across the variety of sensor types and customized configuration profiles. Such generic circuit bards executing the instructions of the firmware retrieved from the sensor memory may also be used in further sensor diagnostics, testing, and calibration, which may result in updating of the configuration profile for the sensor. Such diagnostics, testing, and calibration may be performed during manufacturing, testing prior to shipment, installation, or routine maintenance.

Figure 1B:
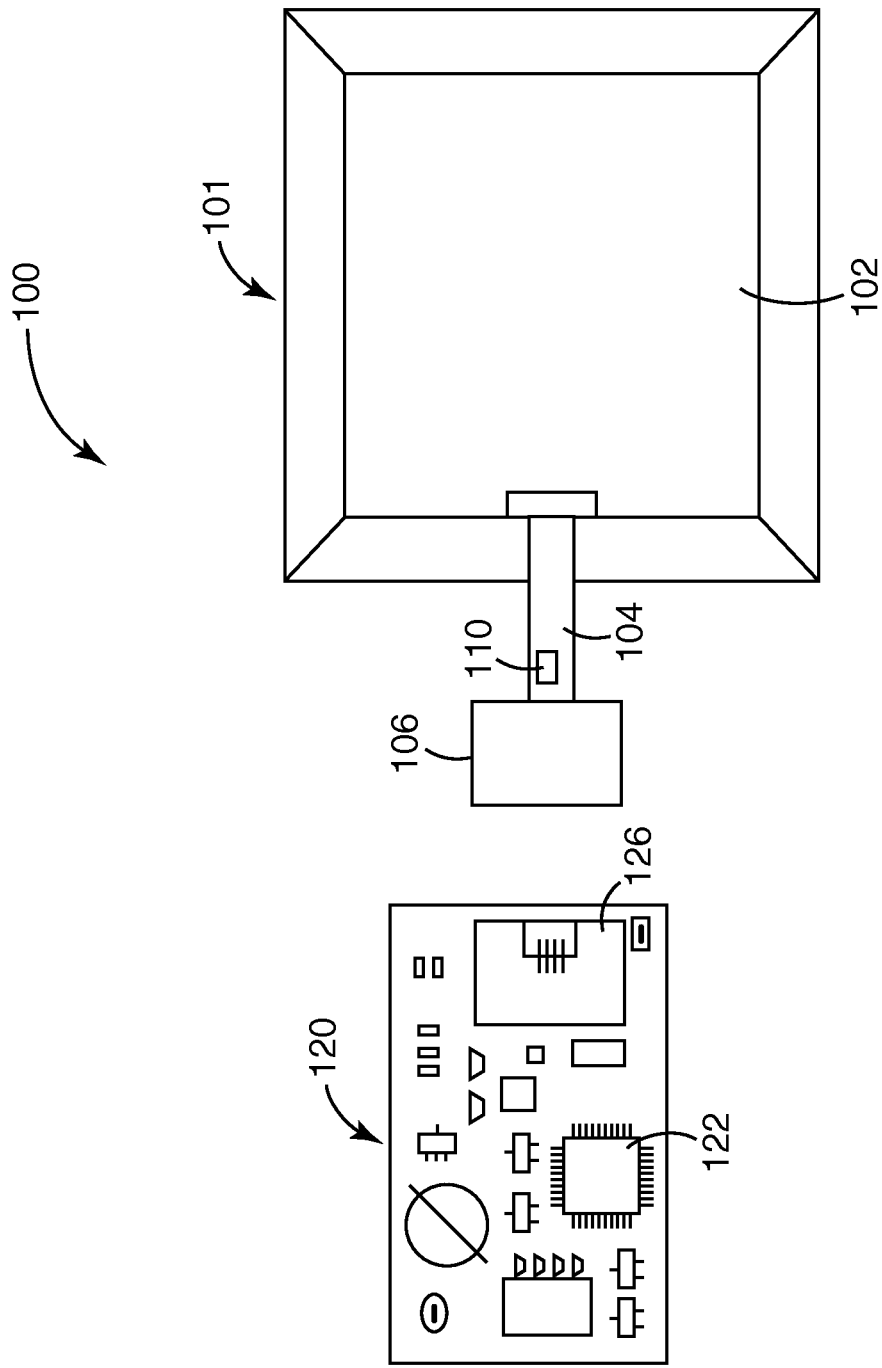
FIG. 1B schematically illustrates the touch sensing circuit arrangement of FIG. 1A.

FIG. 1B schematically shows the same sensor 101 and controller board 120 components shown in FIG. 1A without the overlaid process and data flow information. Exemplary generic controller boards may be based on the controller board platform commercially available from 3M Touch Systems, Inc. under the trade designation EXII. The EXII controller board platform may be particularly well-suited for use with a variety of touch sensor types including analog capacitive touch sensors, analog resistive touch sensors (including 4-wire, 5-wire, 8-wire, and so forth), force or pressuring sensitive touch sensors, and the like.

The controller board 120 may include support electronics to facilitate communications between the memory device 110 attached to the sensor 101 and the controller electronics. The support electronics may include for example, a multiplexer and other a logic circuitry. The multiplexer multiplexes addresses sent to the memory device and the information loaded from the memory device onto the controller electronics. For example, the memory device may store multiple sets of instructions or data at different memory addresses, including data correction coefficients or other sensor-specific information. The logic circuitry may be used to provide enable signals to the memory device.

When the touch sensing circuit arrangement 100 is assembled, the tail 104 routes signal lines for providing drive signals to the sensing elements of the sensor surface 102 and for receiving touch-related signals from the sensor 101. For example, electrodes may be coupled to signal-carrying lines or traces disposed on the sensor surface 102 for applying and receiving touch signals to the sensing elements. The electronics located on the controller board 120 includes circuitry to generate drive signals for the sensing elements and for calculating touch locations from the touch-related signals. For example, in certain embodiments, the controller 120 uses the current sensed through each of a plurality of locations on the touch surface 102 to generate a pair of coordinates for an applied touch input. The controller 120 may also correct for errors associated with position signals due to variations in the sensing elements by applying correction factors, which may be stored in the touch sensor memory device 110. The controller 120 uses the executable instructions of the firmware retrieved from the sensor memory device 110 to perform the touch sensor drive, sense, and measurement functions so that touch positions can be determined.

The touch sensor 101 can be any suitable touch sensor that uses any suitable touch sensing technique. Examples of touch sensing technologies include analog capacitive, analog resistive, force sensing, surface acoustic wave, matrix capacitive, matrix resistive, inductive digitizer, infrared, vibration sensing, and so forth. In some embodiments, the same genericized controller board and processor may be used to drive touch sensors employing different touch sensing techniques, so long as the firmware associated with the particular touch sensor is available.

By way of brief example, a resistive touch sensor employs a flexible membrane positioned over a substrate. The opposing surfaces of the membrane and substrate are each coated with a transparent conductive film. Insulating dot spacers are interposed between the membrane and the substrate. When the flexible membrane is pressed by a user, the conductive film of the membrane contacts the conductive film of the substrate. This contact causes current to flow between the membrane and substrate. The controller identifies the point of contact by comparing the current flowing from various electrodes or busbars printed on the conductive surfaces.

Unlike a resistive sensor, a capacitive touch sensor employs no moving parts. In a capacitive touch sensor, a resistive coating is deposited directly on an insulating substrate such as glass or a plastic film. Electrodes positioned at the corners of the substrate establish an electrical field on the coating. The controller monitors the amount of current flowing through each of these electrodes. A user's finger, or a conductive stylus, in close enough proximity to the resistive coating causes capacitive coupling between the finger or stylus and the coating. This coupling causes a small amount of current to flow through the coating and each of the electrodes. Capacitive coupling through the user's body and ground completes the current path back to the controller. The controller calculates the touch coordinates from the amount of current flowing through each of these electrodes.

Force sensing sensor arrangements generate signals at multiple points distributed over a touch surface based on the amount of force experienced at those points. For example, variable capacitance sensors may be placed at each of the four corners of a touch plate to sense the amount of displacement at each corner to the amount of force translated by a touch input. The closer the touch input is to a corner, the more translated force, and the more displacement that is detected. The controller calculates the touch coordinates from the capacitance change detected at each of the force sensors.

Figure 1C:
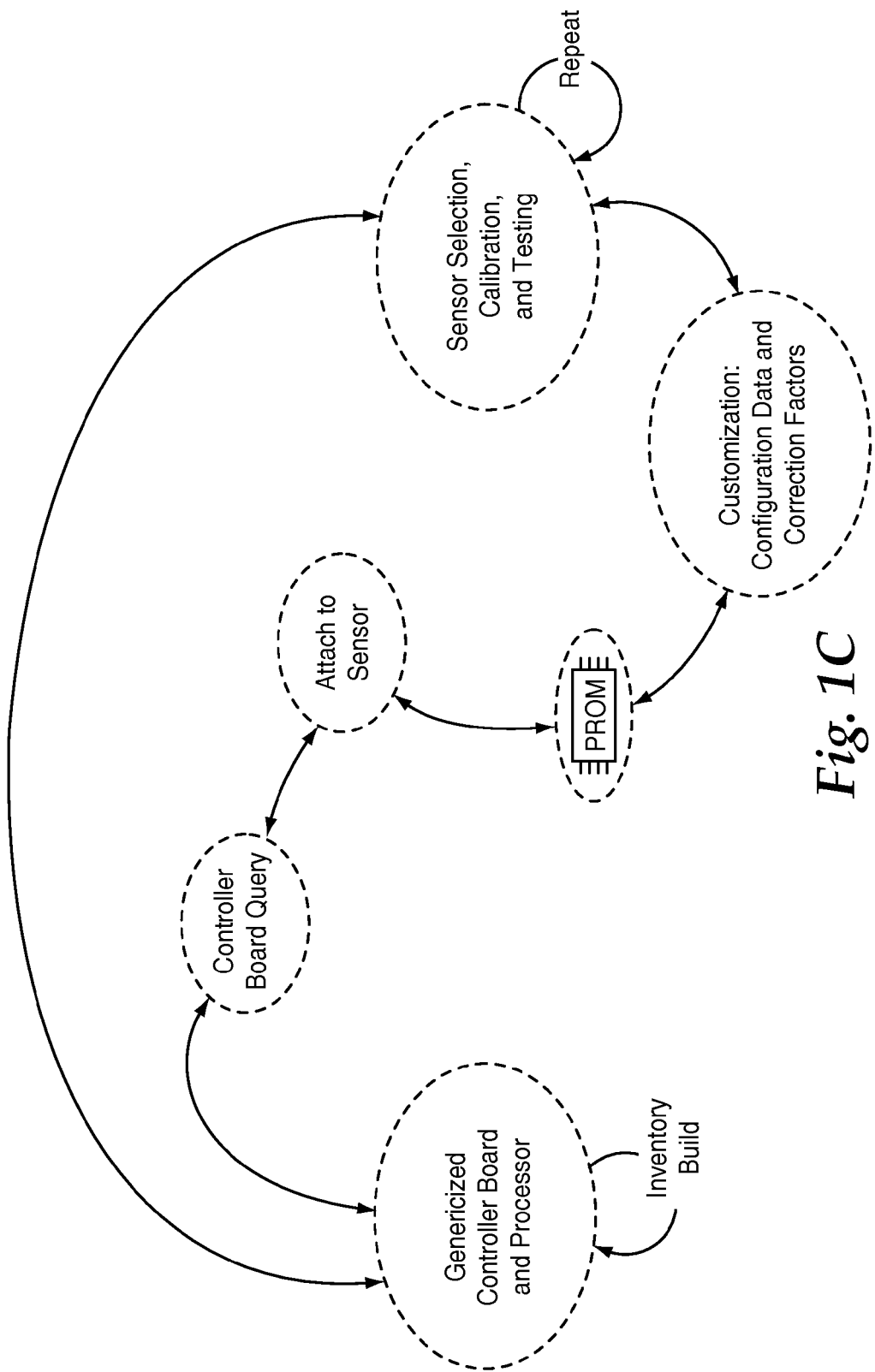
FIG. 1C schematically illustrates the data and process flow items of FIG. 1A.

FIG. 1C schematically shows the process and data flow information from FIG. 1A without showing the sensor and controller board parts. As indicated above, generic controller boards can be produced, thereby building up an inventory of generic controller boards that can be used with each of the variety of sensor types and with each of the customized configuration profiles stored with the sensors. When the controller boards and sensors are assembled, the controller board queries the sensor memory for the firmware and configuration profile and retrieves the touch position determination instructions that are executable by the processor located on the controller board. On the sensor side, different sensor types are selected (capacitive, resistive, force, and so on) along with firmware and customized configuration profiles. The sensors may be calibrated and tested to develop or modify the configuration profiled based on sensor-specific information. The configuration profile and firmware including executable instructions for touch determination and optionally other functionalities is stored on a non-volatile memory device that is attached to the sensor. As such, touch sensing circuit arrangements may be assembled from the customized sensor parts and the generic controller boards without necessitating tracking and mating of certain sensors with certain controllers.

Figure 2:
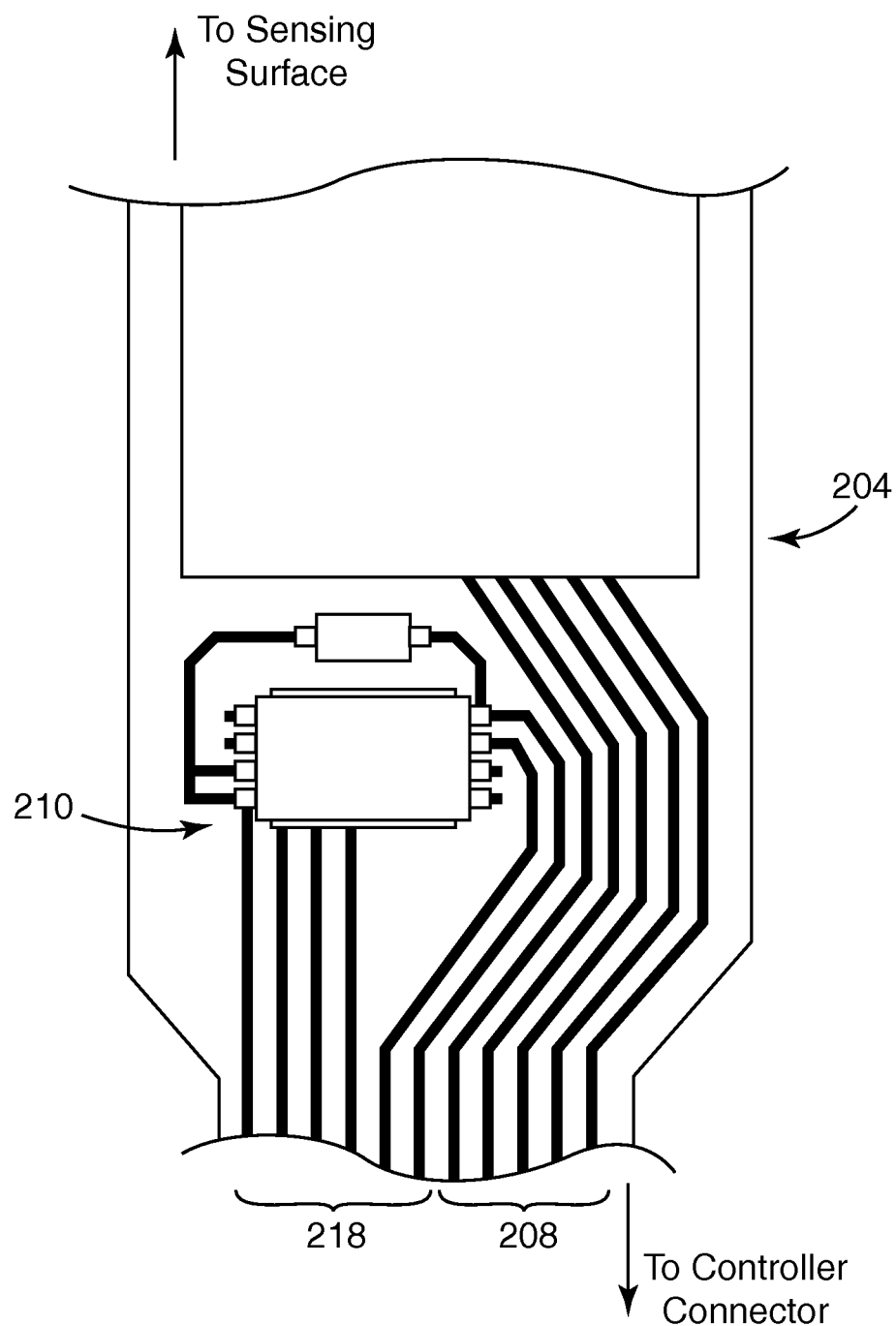
FIG. 2 schematically illustrates an example electrical tail including a memory device for use with customized sensors in accordance with certain embodiments of the present invention.

FIG. 2 schematically shows a portion of an electrical tail 204 of a touch sensor in accordance with certain embodiments of the present invention. The top portion of the tail lead to the sensor (not shown), and routes the touch-related signal lines 208 from the sensor to the connector (not shown) on the other end of the tail 204. In this case, there are five signal lines, as may be found with an analog capacitive touch sensor having four corner signal lines and a rear shield line, with a five wire resistive touch sensor having four corner single lines on one resistive layer and a signal sink line leading to the opposing resistive layer, and other touch sensors that utilize five signal lines. The tail 204 further includes a memory device 210 attached thereto for storing firmware and customized configuration data including instructions executable by the controller board. Several lines 218 lead from the memory device 210 to the connector (not shown) on the end of the tail 204 for interfacing with a controller board.

Figure 3:
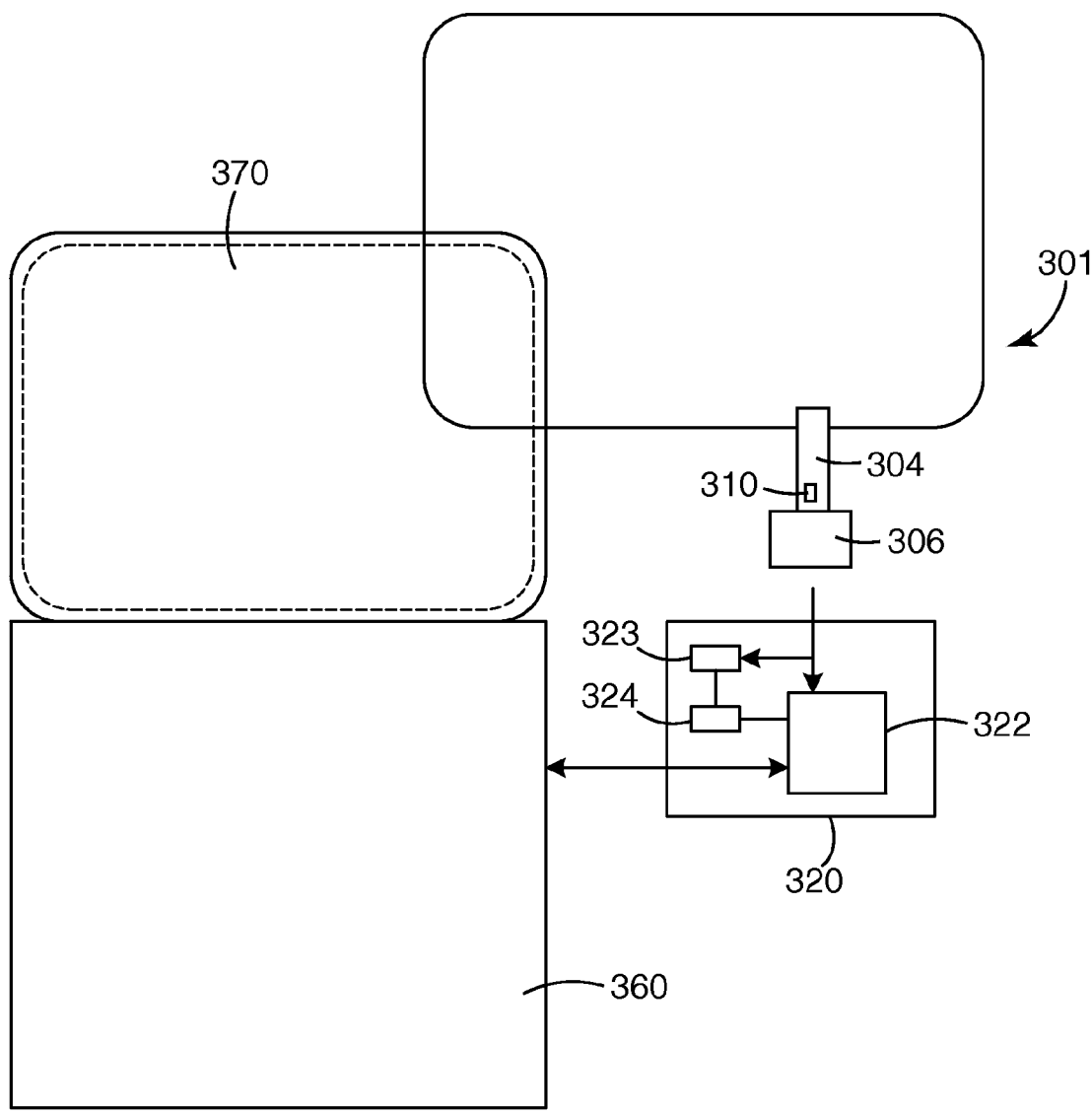
FIG. 3 schematically illustrates a touch input system including a touch sensing circuit arrangement in accordance with certain embodiments of the present invention.

FIG. 3 schematically shows a touch input system including a touch sensor 301 interfacing with a controller board 320, which in turn is connected to a host computer 360.

In certain embodiments, a display device 370 connected to the host computer 360 is viewable through the touch sensor 301 for direct user input interaction with items displayed on the display 370.

The sensor 301 includes an electrical tail 304 for gathering and routing touch-related signals between the sensor 301 and the controller board 320. The tail 304 terminates in an interface connector 306, designed to plug into the controller board 320. A non-volatile memory device 310 is mounted on the tail 304, the memory device 310 storing firmware and customized configuration data including instructions for use by the controller board in determining touch positions from touch-related signals generated by the touch sensor 301, in accordance with certain embodiments of the present invention.

The controller board 320 includes a processor circuit 322 to process touch-related signals received from the touch sensor 301 by executing firmware retrieved from the non-volatile memory device 310 mounted on the electronic tail 304 of the touch sensor 301. In the embodiment shown, the controller board also includes a start-up circuit 324 that executes a hardwired query routine that looks for a memory address off of the controller board from which to load firmware instruction into a temporary local memory 325, for example RAM. The processor 322 functions to execute the firmware instructions loaded onto the temporary memory 325.

Figure 4:
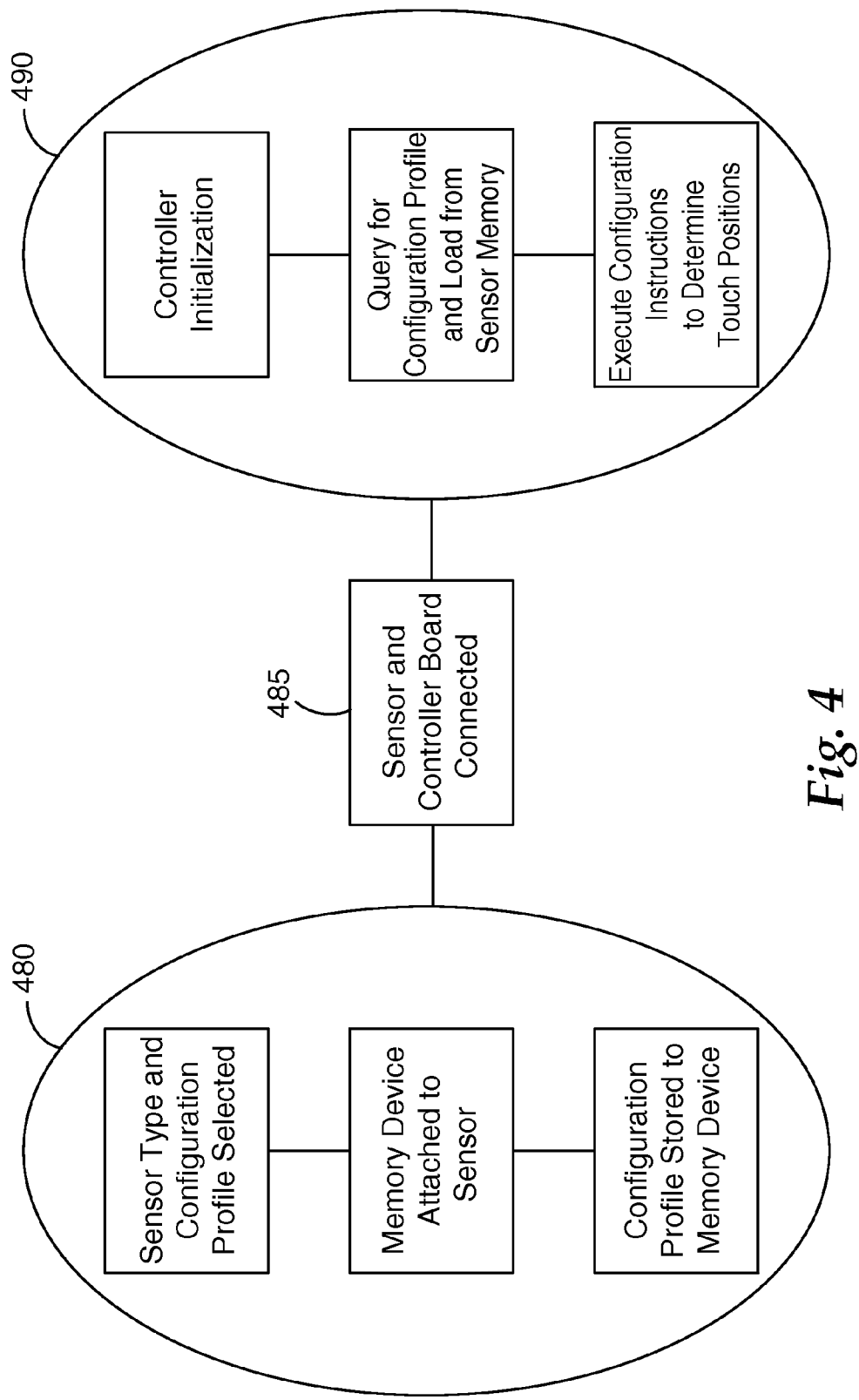
FIG. 4 schematically illustrates steps involved with producing and assembling touch sensing circuit arrangements in accordance with certain embodiments of the present invention.

FIG. 4 schematically shows steps involved in methods of certain embodiments of the present invention. In one group of steps 480, a touch sensor type and a configuration profile are selected, the firmware is stored on a non-volatile memory device, and the memory device is mounted to the sensor. The steps in grouping 480 can be performed in any suitable order. For example, a variety of configuration profiles can be pre-selected and stored on memory devices which are inventoried based on configuration profile and intended sensor type. These pre-loaded memory devices can then be attached to sensors during manufacturing or as they are being tested or prepared for shipment. In other embodiments, the memory devices can be mounted on the sensors during manufacturing, and the firmware and configuration profile can be stored at the latter stages of the manufacturing process or at a later time. The firmware and configuration profile stored on a touch sensor memory device may be overwritten to accommodate late revision modifications, new or modified customer specifications or special functionalities, results of additional calibration and testing, and so forth.

Once a touch sensor prepared in accordance with the steps shown in group 480, the sensor can be connected to a controller board, indicated by step 485. As indicated by the steps in group 490, the controller board is initialized, thereby performing a query routine, for example in response to being powered-up and/or being connected to the touch sensor. The query routine looks for and loads the controller-executable firmware instructions, optionally along with any calibration data or other configuration data, from the sensor memory device onto local memory on the controller board. The controller board is then ready to execute the customized instructions to determine touch input locations based on touch-related signals received from the touch sensor.

In various embodiments, the present invention allows of much or all of the touch sensor system customization to be performed and stored in relation to the sensor. As such, the same controller boards can be used across multiple different sensor types, sensor sizes, configuration profiles, and custom applications. These features lend themselves to more efficient inventory systems based on delayed customization and elimination of the need to mate specific controllers with specific sensors. Instead, a generic controller board platform can be used across a variety of sensor types and configuration profiles. In an exemplary embodiment, a single controller part number is used across a plurality of sensor types and configuration profiles, and specialized part numbers are used only for the customized sensors. This can also reduce the burden on customers, installers, and technicians who might otherwise find the need to manually install firmware from a CD-ROM disc or downloaded from a web site.

Figure 5:
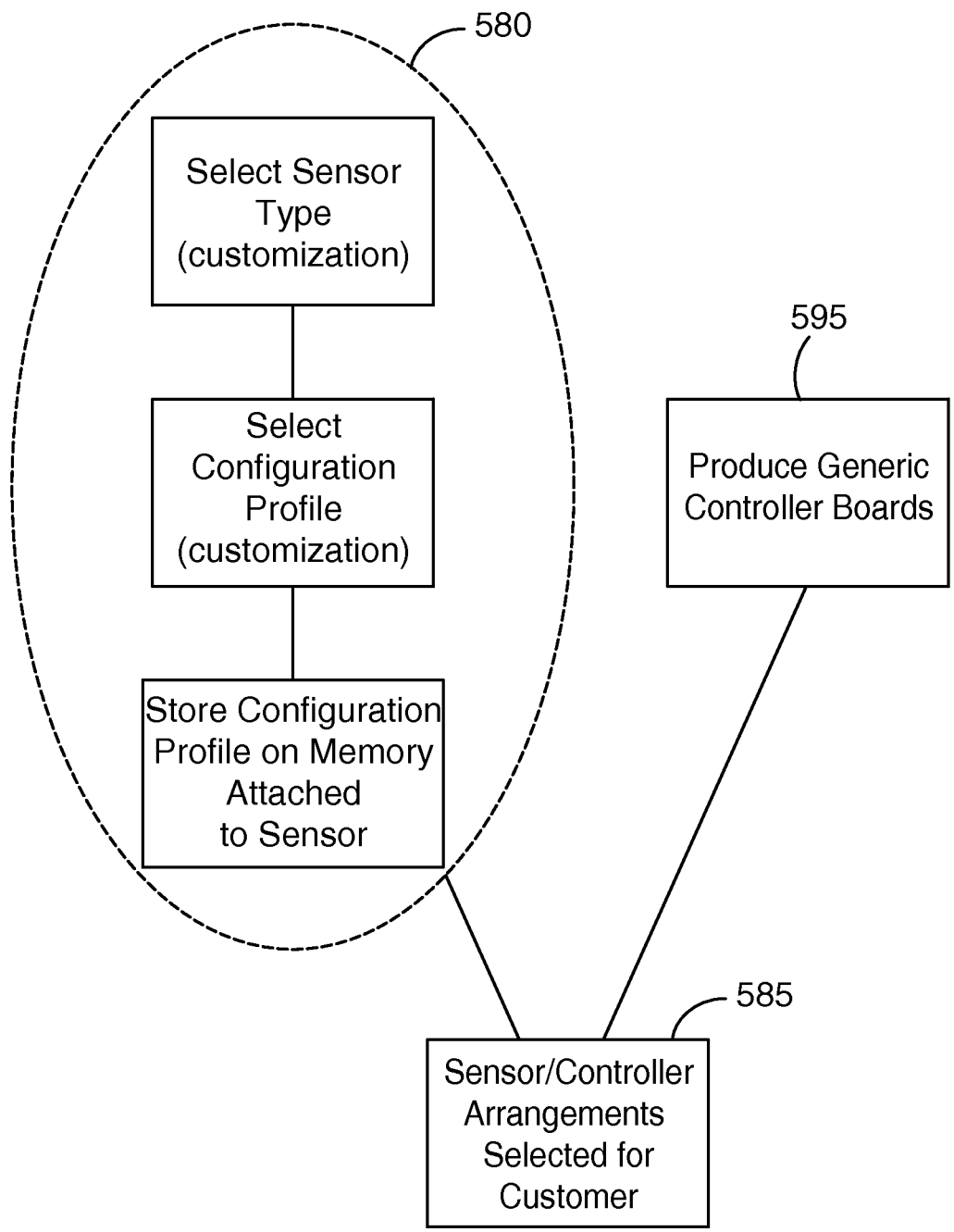
FIG. 5 schematically illustrates steps involved with tracking customized touch sensors and generic controller boards for providing sensing circuit arrangements in accordance with certain embodiments of the present invention.

Delayed customization concepts are schematically indicated in FIG. 5. The steps 580 involved with manufacturing and customizing sensor components may be performed separately from the steps 595 involved with manufacturing controller boards according to a generic controller platform. At the time of shipping, or at another convenient time, the customized sensor(s) and the desired number of generic controller boards can be selected 585 for packaging or otherwise providing to customers without the need to ensure that particular sensors are mated to particular controller boards.

The foregoing description of the various embodiments of the invention has been presented for the purposes of illustration and description. It is not intended to be exhaustive or to limit the invention to the precise form disclosed. Many modifications and variations are possible in light of the above teaching. For example, the detection methodologies described herein may be used in connection with a wide variety of touch implements, including tethered implements and implements that house a battery or other power source. Moreover, the various processing steps can be implemented using a variety of devices and methods including general purpose processors implementing specialized software, digital signal processors, programmable logic arrays, discrete logic components and fully-programmable and semi-programmable circuits. It is intended that the scope of the invention be limited not by this detailed description, but rather by the claims appended hereto.

What is claimed is:

1. A touch sensor coupled to a controller board in a touch sensing circuit arrangement, including computer-executable firmware instructions for determining touch positions,
    wherein the touch sensor includes one or more sensing elements to generate touch-related signals responsive to a touch input to the sensor, and a memory device storing the computer-executable firmware instructions, and
    wherein the controller board includes query logic executable by the controller board to cause the controller board to query for the computer-executable firmware instructions stored on the memory device of the touch sensor, and a processor circuit to determine touch positions by executing the firmware instructions loaded onto the generic controller board in response to the query.

2. The touch sensing circuit arrangement of claim 1, wherein the memory device further stores sensor-specific configuration data developed for the sensor.

3. The touch sensing circuit arrangement of claim 1, wherein the touch sensor further includes a touch signal adaption circuit for conditioning the touch-related signals for use by the controller board.

4. The touch sensing circuit arrangement of claim 3, wherein the touch signal adaption circuit includes at least one amplifier to amplify the touch-related signals.

5. The touch sensing circuit arrangement of claim 1, wherein the query logic includes controller-executable instructions stored on the controller board.

6. The touch sensing circuit arrangement of claim 1, wherein the query logic is hardwired on the controller board.

7. In a system which includes touch sensing circuit arrangement including computer-executable firmware instructions for determining touch positions, and which has a controller board including a processor circuit to determine touch positions using the computer-executable firmware instructions, the system comprising:
    one or more sensing elements to generate touch-related signals responsive to a touch input to a surface of the sensor, the touch-related signals carried by a plurality of signal lines;
    a memory device storing the computer-executable firmware instructions; and
    a connector to communicatively couple the controller board to the signal lines and to the memory device for communication of the touch-related signals and the computer-executable firmware instructions,
    wherein the controller board includes query logic executable by the processor circuit to cause the controller board to query for the computer-executable firmware instructions stored on the memory device of the touch sensor, and wherein the processor circuit determines touch positions by executing the firmware instructions retrieved from the memory device in response to the query.

8. A touch sensor comprising:
one or more sensing elements to generate touch-related signals responsive to a touch input to the one or more sensing elements;
circuitry for communicating the touch-related signals to a communicatively coupled device; and
a memory device storing computer-executable firmware instructions that, when executed by the communicatively coupled device, cause the communicatively coupled device to resolve the touch-related signals into touch input position information,
wherein the communitively coupled device includes query logic executable by the communitively coupled device to cause the communitively coupled device to query for the computer-executable firmware instructions stored on the memory device, and a processor circuit to determine the touch input position information by executing the firmware instructions loaded onto the communitively coupled device in response to the query.

9. The touch sensor of claim 8, wherein the communicatively coupled device is a touch sensor controller board.

10. The touch sensor of claim 9, additionally including a tail for communicatively coupling the touch sensor to the touch sensor controller board, the memory device being attached to the tail.

* * * * *